United States Patent [19]

Yoshimura et al.

[11] Patent Number: 5,045,872
[45] Date of Patent: Sep. 3, 1991

[54] CAMERA FOR TAKING PANORAMIC PHOTOGRAPHY

[75] Inventors: Masaji Yoshimura; Tsuyoshi Kakita, both of Hachioji, Japan

[73] Assignee: Konica Corporation, Tokyo, Japan

[21] Appl. No.: 598,551

[22] Filed: Oct. 16, 1990

[30] Foreign Application Priority Data

Oct. 16, 1989 [JP] Japan .................................. 1-268329

[51] Int. Cl.$^5$ ........................................... G03B 29/00
[52] U.S. Cl. .................................................... 354/94
[58] Field of Search ................................. 354/94, 99

[56] References Cited

U.S. PATENT DOCUMENTS 4,905,030  2/1990  Corrales ............................ 354/94 X Primary Examiner—Michael L. Gellner
Attorney, Agent, or Firm—Jordan B. Bierman

[57] ABSTRACT

A camera for photographing a panoramic photography which is composed of plural separated picture frames. The camera has a detector to detect an angle of photographing view of the camera, a determiner to determine a rotation angle of the camera according to the angle of photographing view, and a movement to rotate the camera in the rotation angle when each of the separated picture frames is photographed. The camera is rotated as to stay the camera on the same plane when the panoramic photography is taken.

4 Claims, 5 Drawing Sheets

5,045,872

CAMERA FOR TAKING PANORAMIC PHOTOGRAPHY

BACKGROUND OF THE INVENTION

This invention relates to a camera with a panoramic photography mode for taking panoramic photographs. A panoramic photograph is a wide angle photograph covering a wide area on both right and left sides, and the photographic technique is often used for mountain photographs and aggregation photographs. There are two methods available for taking panoramic photographs; one is to use a dedicated panoramic camera and the other is to use a usual camera.

In the latter case, to change the direction of the optical axis of the photographic lens on the same plane by preventing the camera from moving vertically or sloping in the vertical plane, that is, to allow the camera to rotate, it is general to fix the camera to a tripod or an appropriate stand. Most of the time, when a camera is held by hands for taking photographs, satisfactory results cannot be produced. A panoramic photograph can be completed by fixing a camera, for example, to a tripod as mentioned above, taking a photograph in a certain photographic direction, remembering the edge of the finder field, rotating the camera to a new photographic direction, taking a photograph once again so that the previously remembered part is overlapped with the edge of the new photographic area, repeating this processing several times, and overlapping and connecting the edges of the photographs.

When the above method is used, however, photographer's intuition and experience are much required, the overlapped part between photographs becomes too wide, causing waste of films, or no overlapped part is provided, causing a defectively connected photograph. Therefore, it is difficult to obtain good panoramic photographs by this method.

The object of the present invention is to provide an apparatus for simply taking clean panoramic photographs without waste of films by solving the above problems.

SUMMARY OF THE INVENTION

To accomplish the above object, the present invention provides a camera comprising a rotation means for rotating it so that the optical axis of the photographic lens is kept on the same plane, which comprises a panoramic photography mode designation means, a residual frame count detection means for detecting the unphotographed frame count of a film loaded in the camera and outputting the information on the residual frame count, a view angle detection means for calculating a photographic view angle on the basis of the focal length information of the photographic lens and outputting the view angle information, a designation means for designating the angular range of camera rotation and outputting the designated angular range information, and an alert means, characterized in that when the panoramic photography mode is designated by the panoramic photography mode designation means, the photographic frame count necessary for panoramic photography is calculated on the basis of the view angle information and the designated angular range information and when the required frame count is larger than the residual frame count, a control means operates the alert means.

DETAILED DESCRIPTION OF THE INVENTION

Figure 1:
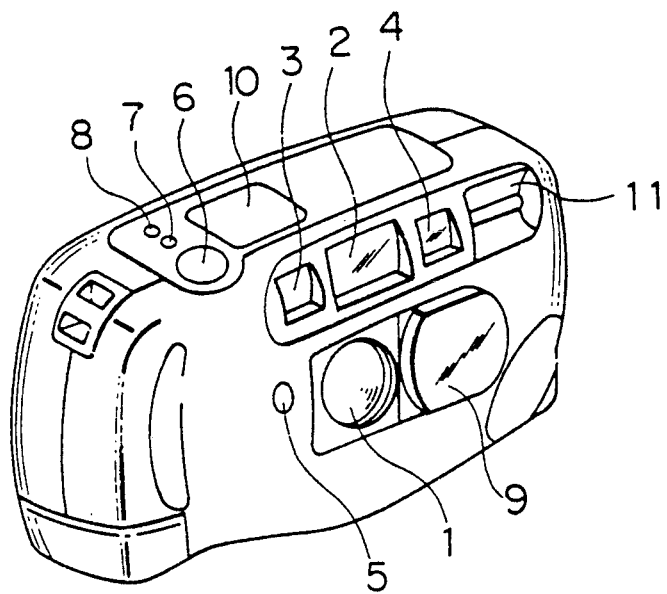
FIG. 1 is a perspective view showing the structure of an example of a camera of the present invention.

The present invention will be described hereunder with reference to the accompanying drawings. FIG. 1 is a schematic view of an embodiment of a camera with a panoramic photography mode of the present invention.

In the figure, numeral 1 indicates a zoom lens, 2 a finder, 3 and 4 an infrared light emission window and a reception window for distance measurement, 5 a photometric window, 6 a release button, 7 a mode switching button for selecting the self timer use mode, strobing mode, or panoramic photography mode, and 8 a photographic area designation button for designating the photographic area in the panoramic photography mode.

Furthermore, numeral 9 indicates a lens barrier (lens cover) for photographic lens protection, 10 a liquid crystal indicator panel for indicating the residual frame count of a film, the panoramic photography mode, or other photography relations information, and 11 a strobe. An operation button, which is not shown in the figure, for driving the zoom lens 1 is provided on the back of the camera.

Next, the oscillating facility for oscillating the camera body vertically or horizontally will be described hereunder with reference to FIGS. 2 to 5.

Figure 2A:
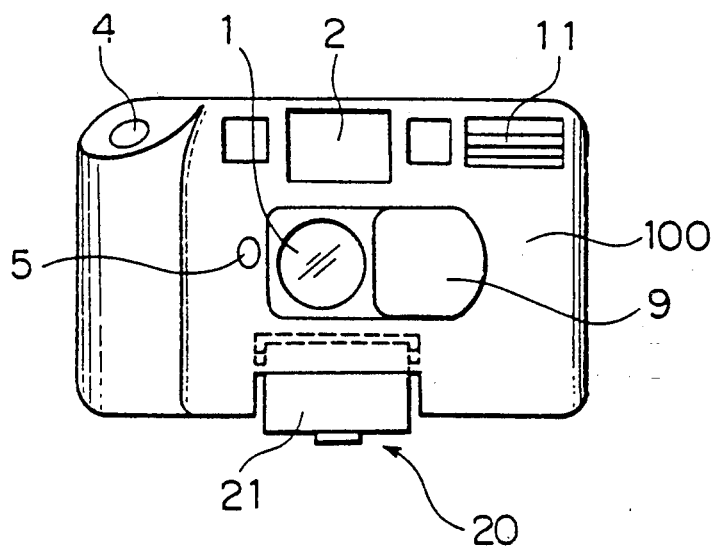
FIGS. 2(A) and 2(B) are a front view and a side view of a camera showing the mounting position of an oscillating facility.
Figure 2B:
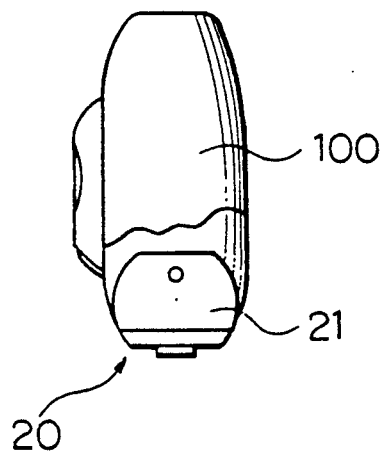

FIGS. 2(A) and 2(B) show the mounting position of the oscillating facility to the camera. An oscillating facility 20 is mounted to a camera body 100 in a case 21 at the center of the bottom of the camera body in a movable state. By fixing the bottom of the case 21 to a stand by an appropriate method, the camera can be fixed in position without using a dedicated camera tool such as a tripod. Since the oscillating operation is available as described later, a simple supporting means can be used as described here.

Figure 3:
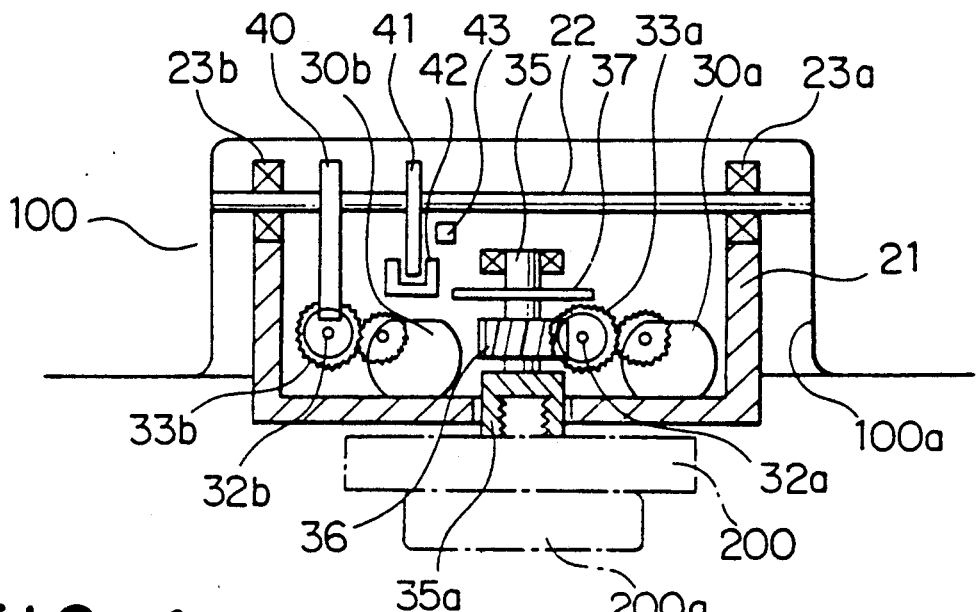
FIG. 3 shows an internal structure of the oscillating facility.
Figure 4:
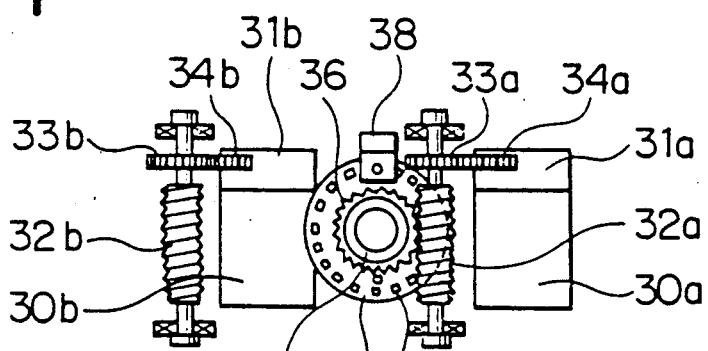
FIG. 4 is a plan view of the essential section of the oscillating facility.
Figure 5:
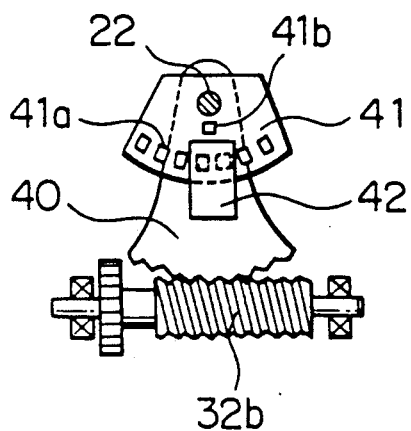
FIG. 5 shows the essential section of the vertical rotation facility of the oscillating facility.

FIGS. 3, 4, and 5 show a detailed structure of the oscillating facility 20.

As shown in FIG. 3, the oscillating facility 20 is installed in a concave 100a at the center of the bottom of the camera body 100, and the case 21 is supported by a support shaft 22, which is horizontally attached to the upper part of the case, via bearings 23a and 23b in a movable state. Both ends of the support shaft 22 are fixed to the camera body so as to prevent the support shaft 22 from rotation.

In the case 21, as shown in FIG. 4, two motors 30a and 30b are horizontally installed and gear boxes 31a and 31b are coaxially installed. The motor 30a is used as a drive source for rotating the camera body horizontally and the motor 30b for rotating the camera body vertically. A worm gear 32a is born near the motor 30a in parallel with the motor shaft so that it does not move in the shaft direction but rotates for the case 21. A flat gear 33a is fixed to the shaft of the worm gear 32a. The flat gear 33a is connected to a gear box 31a via a flat gear 34a in the gear box 31a. In the same way as the worm gear 32a, a worm gear 32b is born near the motor 30b in parallel with the motor shaft. A flat gear 33b is fixed to the shaft of the worm gear 32b. The flat gear 33b is connected to a gear box 31b via a flat gear 34b in the gear box 31b.

Figure 6:
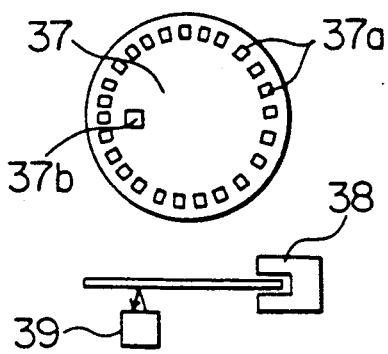
FIG. 6 shows a facility for detecting the rotation angle of a camera.

The worm gear 32a is engaged with a worm wheel 36. A shaft 35, which is vertically attached to the center of the case 21, is connected to the worm wheel 36 via a friction clutch which is not shown in the figure, and a rotation detection disk 37 is fixed to the upper part of the shaft 35. Holes 37a are formed on the periphery of the rotation detection disk 37 at a predetermined interval (for example, every 1°), and a hole 37b (see FIG. 6) for detecting the front position of the camera is formed between the holes 37a and the center of the disk. A transmission type photointerrupter 38 (see FIG. 4) is attached to the case 21 so that it encloses the periphery of the rotation detection disk 37 like an arc, and a reflection type photointerrupter 39 is installed at the location which is slightly inside the periphery and the hole 37b passes through. At the bottom end of the shaft 35, a setboss 35a, which a setscrew 200a of a tripod 200 (shown by an alternate long and short dash line in FIG. 3) is screwed to, is attached.

With the other worm gear 32b, as shown in FIG. 5, a fan-shaped worm plate 40 is engaged. The worm plate 40 is connected to the support shaft 22 via a friction clutch which is not shown in the figure, and a fan-shaped vertical angle detection plate 41, which is installed near the worm plate, is also fixed to the support shaft 22. A plurality of holes 41a are formed along one side edge of the vertical angle detection plate 41 at an equal interval, and a horizontal position detection hole 41b is formed between the holes and the support shaft 22. An arc-shaped transmission type photointerrupter 42 is attached to the case 21 so that it encloses the side edge of the vertical angle detection plate 41, and a reflection type photointerrupter 43 is installed near the vertical angle detection plate 41 at a location facing to the hole 41b.

Next, the oscillating operation of the camera will be described hereunder.

When the horizontal rotation motor 30a rotates, the gear in the gear box 31a rotates, and the worm gear 32a rotates via the flat gears 34a and 33a. Since the worm wheel 36 is engaged with the worm gear 32a, the shaft 35 rotates via a friction clutch which is not shown in the figure. The setscrew 200a of the tripod 200 is screwed to the setboss 35a at the bottom end of the shaft 35. Since the resistance of the fixed tripod 200 to rotation is higher than the resistance of the camera body 100 to rotation, the tripod 200 does not rotate but the camera body 100 rotates in the direction opposite to the rotation direction of the shaft 35 as a reaction thereof. When the horizontal rotation motor 30a rotates reversely, the camera body 100 also rotates reversely. By doing this, the camera body 100 rotates to right or left on the tripod 200.

When the vertical rotation motor 30b rotates, the gear in the gear box 31b rotates, and the worm gear 32b rotates via the flat gears 34b and 33b. Since the worm plate 40 is engaged with the worm gear 32b, the worm plate 40 rotates round the support shaft 22 via a friction clutch, which is not shown in the figure, together with the support shaft 22. As a result, the camera body 100, which is fixed to the support shaft 22 at both ends thereof, rotates, for example, upward. When the vertical rotation motor 30b rotates reversely, the camera body 100 rotates, for example, downward. By doing this, the camera body 100 oscillates vertically on the tripod. A tripod is used in the above example, though there is no need to use a tripod. By fixing the bottom of the case 21 to a stand by an appropriate method, the same result may be obtained. The initially designated direction of the camera body 100 in the horizontal plane can be detected by the output of the reflection type photointerrupter 39 when the light, which is reflected off of the rotation detection disk 37 and irradiated to the photosensor of the photointerrupter 39, is not irradiated due to the hole 37b of the rotation detection disk 37. The oscillation angle of the camera body 100 in the horizontal plane can be detected by the output of the photointerrupter 38 depending on the presence or absence of light transmitting through the holes 37a on the periphery of the rotation detection disk 37. The initially designated direction of the camera body 100 in the vertical plane can be detected by the output of the reflection type photointerrupter 43 when the light, which is reflected off of the vertical angle detection plate 41 and irradiated to the photosensor of the photointerrupter 43, is not irradiated due to the hole 41b of the vertical angle detection plate 41. The oscillation angle of the camera body 100 in the vertical plane can be detected by the output of the photointerrupter 42 depending on the presence or absence of light transmitting through the holes 41a on the periphery of the vertical angle detection plate 41.

Figure 7:
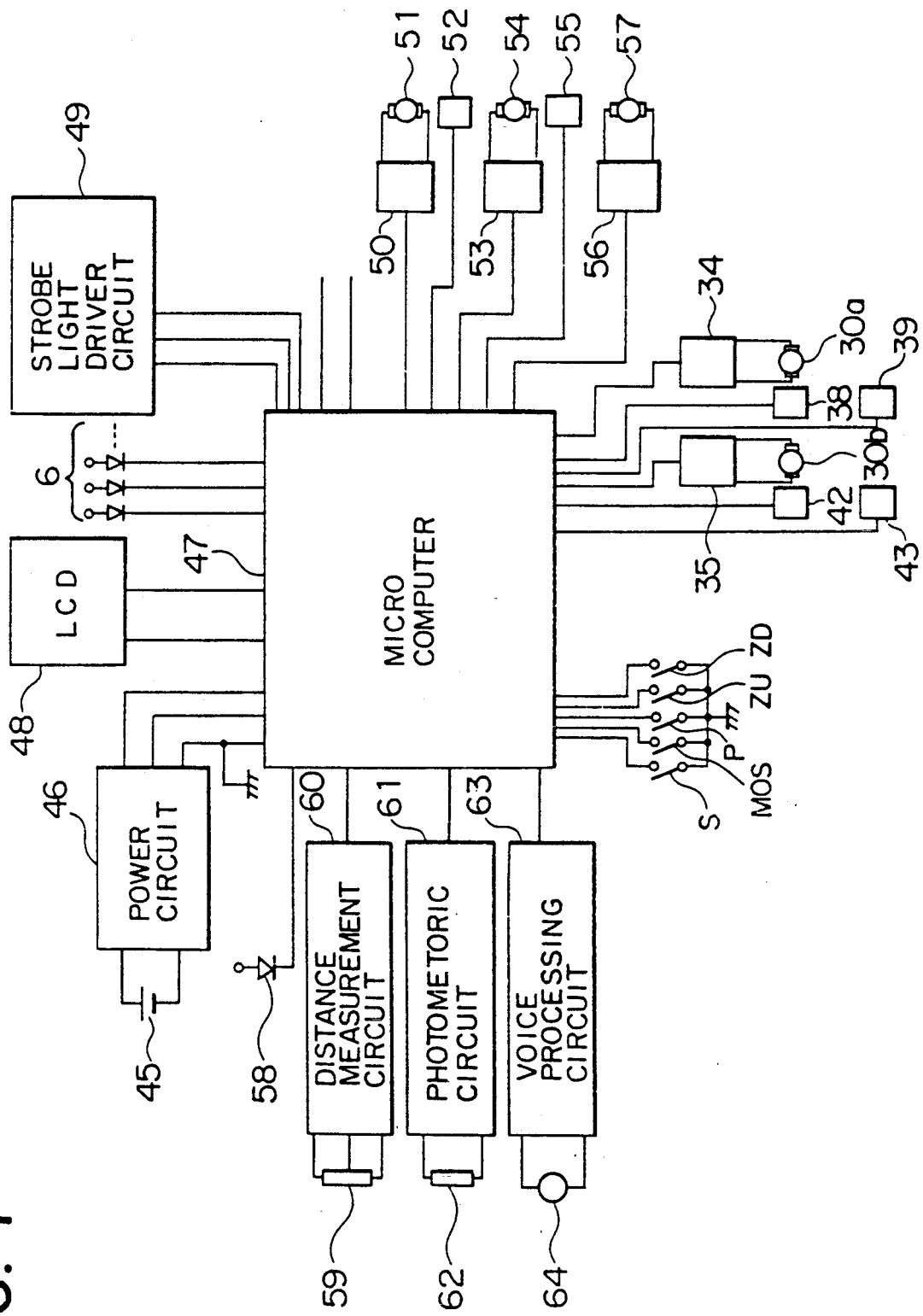
FIG. 7 is a block diagram showing the circuit configuration of a camera of an embodiment.

FIG. 7 is a block diagram showing the circuit configuration of the camera shown in FIG. 1.

In the figure, numeral 45 indicates a battery, 46 a power circuit for supplying power to each unit of the camera circuit, and 47 a micro computer containing an AD converter for controlling the photographic sequence. Numeral 48 indicates a LCD and a drive circuit thereof for the liquid crystal indicator panel 10, 49 a strobe light driver circuit for driving a strobe 11, 50 a shutter motor driver for driving a shutter drive motor 51, and 52 a sensor for detecting the location of the shutter blade. On the IC pins of the micro computer 47, a moistureproof material such as silicon is coated in the dry state after soldered to the patterns of the PC boards. By doing this, short-circuits of pins and noise affection can be effectively prevented.

Numeral 53 indicates a lens motor driver for controlling a photographic lens drive motor 54, 55 a lens position sensor for detecting the movement position of the photographic lens, and 56 a film motor driver for driving a film feed motor 57.

As units related to the oscillating facility 20, a driver 34 for controlling the horizontal rotation motor 30a and a driver 35 for controlling the vertical rotation motor 30b are installed. The horizontal rotation position of the camera body is detected by the photointerrupters 38 and 39, and the vertical rotation position of the camera body is detected by the photointerrupters 42 and 43. As to switches, a symbol S indicates a release switch which is turned ON when a release button 6 is pressed, MOS a switch which is turned ON when a mode selector button 7 is pressed, P a switch which is turned ON when a photographic area designation button 8 is pressed, ZU a switch for moving the zoom lens to the telephotography side, and ZD a switch for moving the zoom lens to the wide side.

Numeral 58 indicates a distance measurement infrared LED for irradiating infrared light to an object, 59 a photosensor such as a PSD for receiving reflected light from an object, 60 a distance measurement circuit for detecting the distance between the light receiving position of the photosensor 59 and an object, 61 a photometric circuit for measuring the brightness of an object when the output of a photosensor 62 is received, 63 a driver for driving a zooming motor 64, and 65 a zooming sensor for detecting the zoom lens position or the focal length of the zoom lens.

Figure 8:
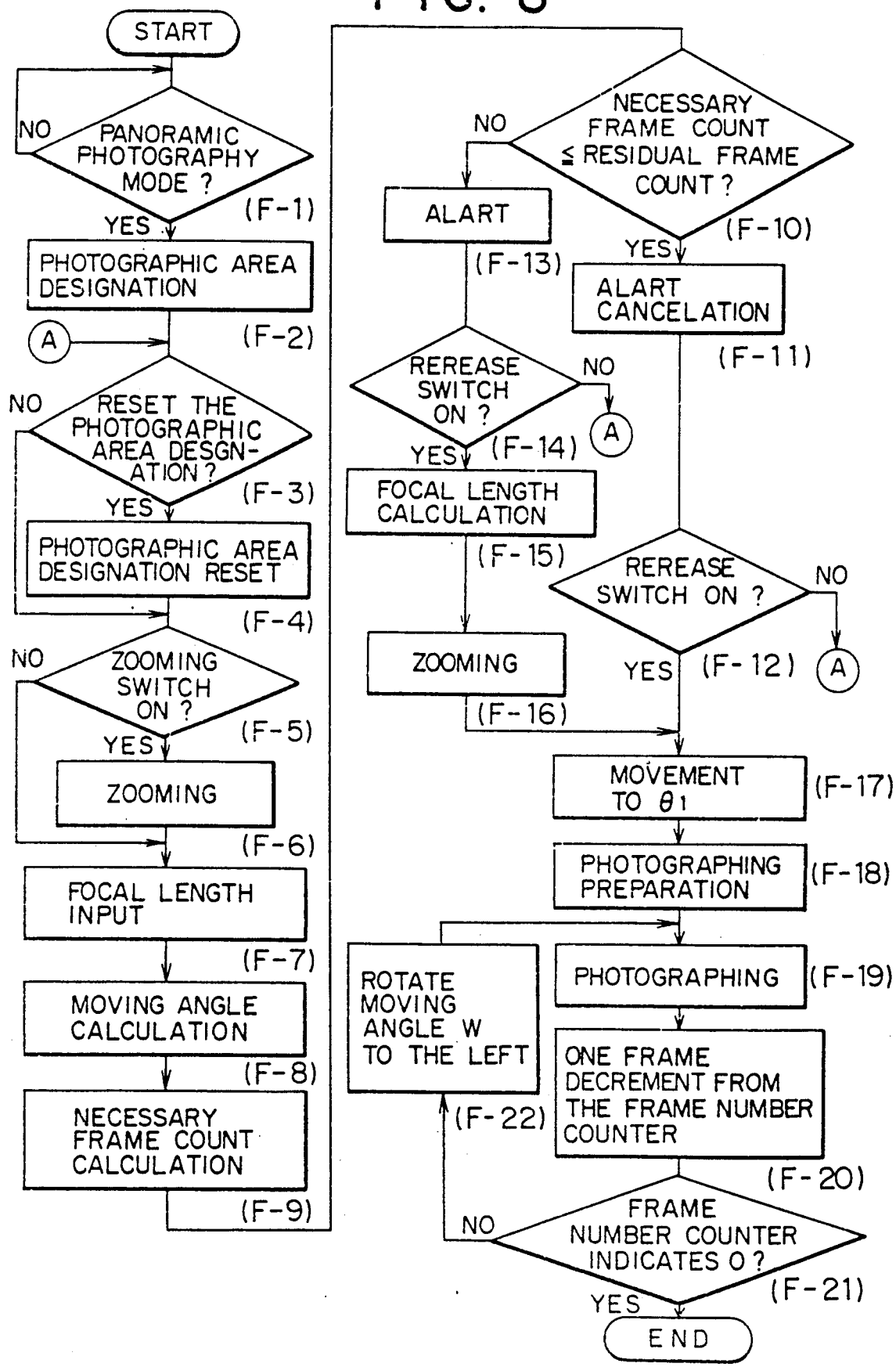
FIG. 8 is a flow chart for explaining the operation of the embodiment.
Figure 9:
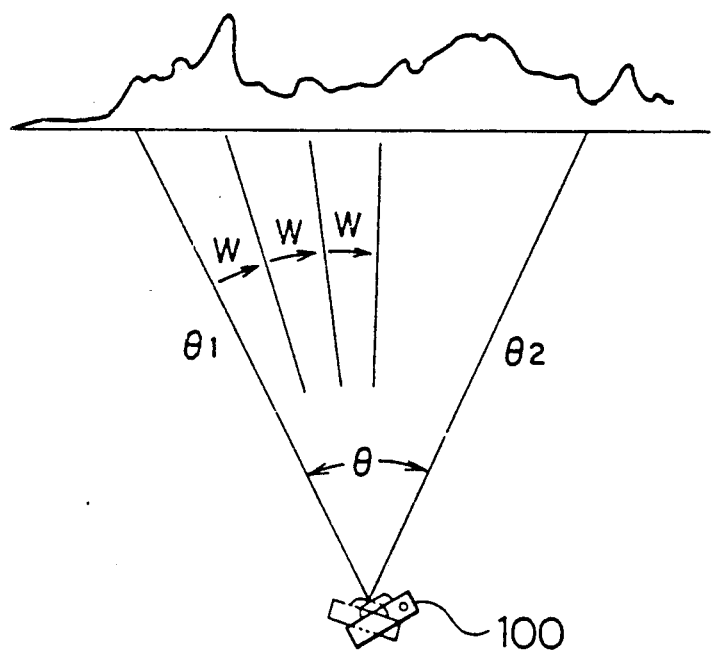
FIG. 9 is a drawing for explaining panoramic photography by the camera of the embodiment.

Next, the operation of the embodiment will be described hereunder with reference to the flow chart shown in FIG. 8. An example that a mountain panoramic photograph as shown in FIG. 9 is taken by the camera 100 between angles $\theta_1$ and $\theta_2$ will be described.

First, whether the panoramic photography mode is designated or not is decided from whether the MOS switch is turned ON or not (F-1). When the panoramic photography mode is selected, a message indicating it is displayed on the liquid crystal indicator panel 10, and then the photographic area is designated (F-2).

There are various methods available for photographic area designation. An example is as follows: Turn the camera 100 to the direction at an angle of $\theta_1$ against the connection force of the foregoing friction clutch and press a photographic area designation button 8. Then, turn the camera to the direction at an angle of $\theta_2$ and press the photographic area designation button 8 once again. Those angles are detected by the photointerrupters 38 and 39, and stored in the microcomputer 47. The photographic area $\theta$ can be obtained from the difference ($\theta = \theta_1 - \theta_2$). Needless to say, a method that the values of $\theta_1$ and $\theta_2$ are directly entered may be used, or another method that the camera is rotated horizontally by the horizontal rotation motor 30a which is provided with another operation means and stopped at a predetermined rotation angle, and then the photographic area designation button 8 is pressed, may be used.

When the photographic area designation is to be changed (F-3), the photographic area is designated once again by performing the same operation (F-4). When the zooming switch ZU or ZD is turned ON (F-5), the zooming operation is performed (F 6) and the focal length information is entered from the zooming sensor 65 (F-7). Assuming that the focal length is "f", the view angle W can be obtained from the following expression when the width of the picture frame is 36 mm:

$$W = 2 \tan^{-1}(18/f)$$

This view angle W is designated as a moving angle of the camera in the horizontal plane (F-8). Needless to say, the moving angle may be designated slightly narrower than the view angle W so as to provide each photograph with an overlapped part.

In this embodiment, the moving angle is designated as W, and the necessary frame count n of a film is obtained from the following expression using the value of W and the moving range $\theta$(F-9):

$$n = \theta/W$$

In this case, the decimal value of the frame count is rounded to 1.

Unless the residual frame count of a film is equal to or more than the necessary frame count n, no panoramic photography is available. The liquid crystal indicator panel 10 of the camera indicates the residual frame count of a film, and from this information, whether the residual frame count is equal to or more than the necessary frame count n is determined (F-10). When the residual frame count of the film is less than the necessary frame count n, the liquid crystal indicator panel 10 displays an alert message (F-13). When the release switch S is not ON (F-14), the step is returned to F-3; that is, the photographic area is designated once again, or it is necessary to change the focal length. When the release switch is ON, the focal length f', which allows for taking panoramic photographs on the residual frames, is calculated (F-15). For that purpose, the view angle W' for a frame when the residual n' frames are used for photography is obtained from the following expression:

$$W' = \theta/n'$$

Then, the focal length f' suited for the view angle W' is obtained from the following expression:

$$f' = 18/\tan(W'/2)$$

The zoom lens 1 is zoomed so that the focal length thereof is f', and n' is designated in a frame counter (F-16).

When the residual frame count of a film is equal to or more than the necessary frame count n at the step F-10, the alert message issued at the step F-13 is canceled, and n is designated in the frame counter (F-11). When the release switch is turned ON next (F-12), the motor 30a is driven, the camera is moved to the $\theta_1$ position (F-17), and photographic preparations are made (F-18).

Photographic preparations include distance measurement and photometry.

Then, photographs are taken (F-19). The photographic operations include lens drive, shutter drive, lens return, and film winding according to the measured distance. Then, the frame counter is decremented (F-20) and checked (F-21). When the frame counter is not 0, the camera is rotated at a moving angle of W (or W') (F-22), and camera rotation and photography are repeated until the frame counter is reduced to 0.

In the above embodiment, a camera, which indicates the residual frame count of a film on the liquid crystal indicator panel 10, is used. In a camera provided with a usual sequential frame counter, the film frame count indicated on a DX patrone may be detected by the camera and the number of frames to be photographed may be subtracted from the number or the number of frames loaded in a patrone may be set in the camera by any means, and the number of frames to be photographed may be subtracted from the number.

In the above embodiment, a camera with a zoom lens is used. In the case of a camera with a single focal length or two focal lengths, it is desirable that the camera is configured so that it jumps to the step F-3 after an alert message is issued at the step F-13. In the above embodiment, the width of the camera screen for panoramic photography is longer than the length thereof.

Vertical panoramic photography using a vertically oscillating facility for the above camera is available. Also, panoramic photography, using a vertically or horizontally oscillating facility when a camera is set so that the screen length is longer than the width, is available.

As described above, since a camera provided by the present invention rotates at an angle almost equivalent to the view angle in the designated photographic area by a rotation means each time, it does not require experience and intuition, eliminates waste of films, and provides simple and well-organized panoramic photographs.

What is claimed is:

1. A camera for photographing a panoramic photography consisting of a plurality of separated picture frames, comprising;
   means for detecting an angle of photographing view of said camera,
   means for determining a rotation angle of said camera according to said angle of photographing view, and
   means for rotating said camera in said rotation angle when each of said separated picture frames is photographed,
   wherein said rotation means rotates said camera so that an optical axis of said camera stays on a same plane.

2. The camera claimed in claim 1, further comprising;
   means for selecting a panoramic mode whereby said camera is set to photographing said panoramic photography.

3. The camera claimed in claim 1, further comprising;
   means for detecting a number of residual frames of a film installed in said camera,
   means for determining a number of necessary frames to photograph said panoramic photography according to said rotation angle,
   means for alerting when said residual frame number is less than said necessary frame number.

4. The camera claimed in claim 3, further comprising;
   means for selecting a panoramic mode whereby said camera is set to photographing said panoramic photography.

* * * * *